US 8,264,964 B1

(12) United States Patent
Pawar et al.

(10) Patent No.: US 8,264,964 B1
(45) Date of Patent: *Sep. 11, 2012

(54) ENHANCED REVERSE-LINK AUXILIARY PILOT TRIGGER

(75) Inventors: Hemanth Pawar, Herndon, VA (US); Shilpa Kowdley Srinivas, Herndon, VA (US); Badri Subramanyan, Overland Park, KS (US); Piyush Upadhyay, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/569,120

(22) Filed: Sep. 29, 2009

(51) Int. Cl.
H04L 1/00 (2006.01)
(52) U.S. Cl. ........ 370/235; 370/328; 370/331; 370/470; 370/342
(58) Field of Classification Search .................. 370/328, 370/331, 335, 318, 342, 235, 470; 455/522, 455/450, 445, 453
See application file for complete search history.

(56) References Cited

U.S. PATENT DOCUMENTS

| | | | |
|---|---|---|---|
| 7,280,510 B2 * | 10/2007 | Lohtia et al. | 370/335 |
| 2004/0160914 A1 | 8/2004 | Sarkar | |
| 2004/0160984 A1 * | 8/2004 | Sidhushayana et al. | 370/474 |
| 2004/0218559 A1 * | 11/2004 | Kim et al. | 370/318 |
| 2004/0246924 A1 * | 12/2004 | Lundby et al. | 370/332 |
| 2006/0067292 A1 * | 3/2006 | Ong et al. | 370/342 |
| 2007/0165704 A1 * | 7/2007 | Yang et al. | 375/148 |
| 2007/0253450 A1 * | 11/2007 | Kuroda et al. | 370/500 |

OTHER PUBLICATIONS

Office Action in U.S. Appl. No. 12/478,827 mailed Feb. 22, 2011.
Unpublished U.S. Appl. No. 12/243,070 entitled "Variable Auxiliary Pilot Trigger and Performance" filed Oct. 1, 2008 in the name of Debasish Sarkar et al.
Unpublished U.S. Appl. No. 12/432,311, entitled "Dynamic Payload-Size Threshold for Triggering an Auxiliary Pilot" filed Apr. 29, 2009 in the name of Sachin R. Vargantwar et al.
Unpublished U.S. Appl. No. 12/478,827 entitled "Reverse Noise Rise Based Payload Threshold Determination for Auxiliary Pilot Trigger" filed Jun. 5, 2009 in the name of Siddharth Oroskar et al.
Unpublished U.S. Appl. No. 12/634,818, entitled "Auxiliary Pilot Trigger Based on Latency" filed Dec. 10, 2009 in the name of Debasish Sarkar et al.
Office Action in U.S. Appl. No. 12/634,818 mailed Nov. 29, 2011.

* cited by examiner

*Primary Examiner* — Ricky Ngo
*Assistant Examiner* — Rasheed Gidado

(57) ABSTRACT

A method and system is disclosed for enhanced reverse-link auxiliary pilot triggering in an access terminal. An access terminal operating in a first state in which it transmits a primary beacon signal on an air interface link to a base station and concurrently transmits a secondary beacon signal to the base station upon a condition that the access terminal transmits packets with payloads exceeding a threshold size, may receive a command from the base station to unconditionally transmit the secondary beacon signal. In response to receiving the command, the access terminal will transition to operating in a second state in which it transmits a primary beacon signal on the air interface link to a base station and concurrently and unconditionally transmits the secondary beacon signal to the base station.

28 Claims, 8 Drawing Sheets

ENHANCED REVERSE-LINK AUXILIARY PILOT TRIGGER

BACKGROUND

In a typical cellular radio communication system (wireless communication system), an area is divided geographically into a number of cell sites, each defined by a radio frequency (RF) radiation pattern from a respective base transceiver station (BTS) antenna. The base station anetnnas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station (or sector or a BTS) on a "forward link" and sends data to the base station on a "reverse link." Data on either link are encoded by the sender and decoded by the receiver. To facilitate decoding, the sender also transmits a beacon or "pilot" signal that, among other functions, provides the receiver with a timing reference for other signals transmitted by the sender. Under certain conditions, an AT can transmit on its reverse link a secondary beacon, or "auxiliary" pilot, that boosts the power of its "primary" pilot, and thereby enhances the precision and reliability of the base station's timing reference for the AT.

The access terminal switches its auxiliary pilot on and off in response to the size of the data payloads that the AT transmits in link-layer packets to its serving base station. More specifically, the size of a data payload corresponds to a volume of data transmitted per unit time, such that the larger the payload size, the higher the density of information per payload, and vice versa. As the payload size (and the density of information) increases, the precision and reliability of the base station's timing reference becomes more important to the base station's ability to correctly decode received data packets. In order to ensure a precise and reliable timing reference, the AT uses a threshold payload size to determine whether or not to trigger its auxiliary pilot, turning the auxiliary pilot on when the payloads of transmitted packets exceed the threshold size and turning it off when they are below threshold size.

The threshold payload size is set in a system parameter that is disseminated to all AT operating in the wireless communication system. The value of the system parameter is determined, in part, according to various performance tradeoffs. A larger value will cause ATs to transmit larger payloads before triggering their auxiliary pilots. The result can be longer average battery life for the ATs, as well as less reverse link interference, but at the possible expense of higher decoding error rates of packets at the base stations. A smaller value will cause ATs to trigger their auxiliary pilots for smaller transmitted payload sizes. The result can be more reliable decoding of packets by the base stations, but at the possible expense of shorter average battery life for the ATs and more reverse link interference. Since the value of the threshold payload size parameter remains relatively fixed, possibly being adjusted only from time to time by the system operator, for example, the performance tradeoffs used in determining the value cannot take account of more immediate RF conditions that can vary dynamically in time and among ATs operating in the wireless communication system.

At the same time, there are various communications from an access terminal to the RAN that can be used by a base station to discern the instantaneous RF conditions on the AT's reverse link. In particular, under IS-856, an AT with an active communication session transmits periodic messages to request a particular forward-link data rate from its serving base station (or sector). Depending on the real-time operating conditions, not all such messages may be properly received by the base station. The base station will typically track failed receptions of data-rate messages from a given AT as an error rate. Since the error rate depends, at least in part, on the real-time RF conditions on the AT's reverse link, the error rate may be used as a dynamic indicator of those conditions.

Under conventional operation, the serving base station (or sector) will cease communicating with an AT if the error rate of reception of data-rate messages exceeds one or another threshold. When this happens, the AT's session is interrupted while the AT attempts to acquire access from another base station (or sector), possibly at a lower data rate. Yet, it may be possible to achieve a reduction in the error rate at the serving base station if the AT switches on its auxiliary pilot, thereby helping to compensate for poor or suboptimal reverse-line RF conditions. However, an AT conventionally operates its auxiliary pilot only in response to the size of its transmitted data packets. Therefore, it would be advantageous for the serving base station (or sector) to be able to trigger an AT's auxiliary pilot in response to measured reverse-link RF conditions. Accordingly, embodiments of the present invention advantageously provide an enhanced reverse-link auxiliary pilot trigger that can be invoked by an AT's serving base station (or sector).

Hence in one respect, various embodiments of the present invention provide, in an access terminal configured to operate in a wireless communication system that includes a base station, a method comprising: operating in a first state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; and while operating in the first state, upon receiving a first message from the base station, the first message comprising a command to transmit the secondary beacon signal, transitioning to operating in a second state in which at least (i) the access terminal transmits the primary beacon signal, and (ii) the access terminal concurrently and unconditionally activates and transmits the secondary beacon signal.

In another respect, various embodiments of the present invention provide, in a base station configured to operate as part of a wireless communication system, a method comprising: at the base station, receiving a primary beacon signal transmitted from an access terminal; at the base station, making a first determination that particular signals received from the access terminal have been detected below a first threshold level; and responsive to the first determination, transmitting a first message to the access terminal, the first message comprising a command to unconditionally transmit a secondary beacon signal concurrently with transmission of the primary beacon signal.

In still another respect, various embodiments of the present invention provide an access terminal configured to operate in a wireless communication system that includes a base station, the access terminal comprising: means for operating in a first state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; means for receiving a first message from the base station while operating in the first state, the first message comprising a command to transmit the secondary beacon signal; and means for, responsive to receiving the first message, transitioning to operating in a second state in which at least (i) the access terminal transmits the primary beacon signal, and (ii) the access terminal concurrently and unconditionally activates and transmits the secondary beacon signal.

In yet another respect, various embodiments of the present invention provide a base station configured to operate as part of a wireless communication system, the base station comprising: means for receiving a primary beacon signal transmitted from an access terminal; means for making a first determination that particular signals received from the access terminal have been detected below a first threshold level; and means for transmitting a first message to the access terminal in response to the first determination, the first message comprising a command to unconditionally transmit a secondary beacon signal concurrently with transmission of the primary beacon signal.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
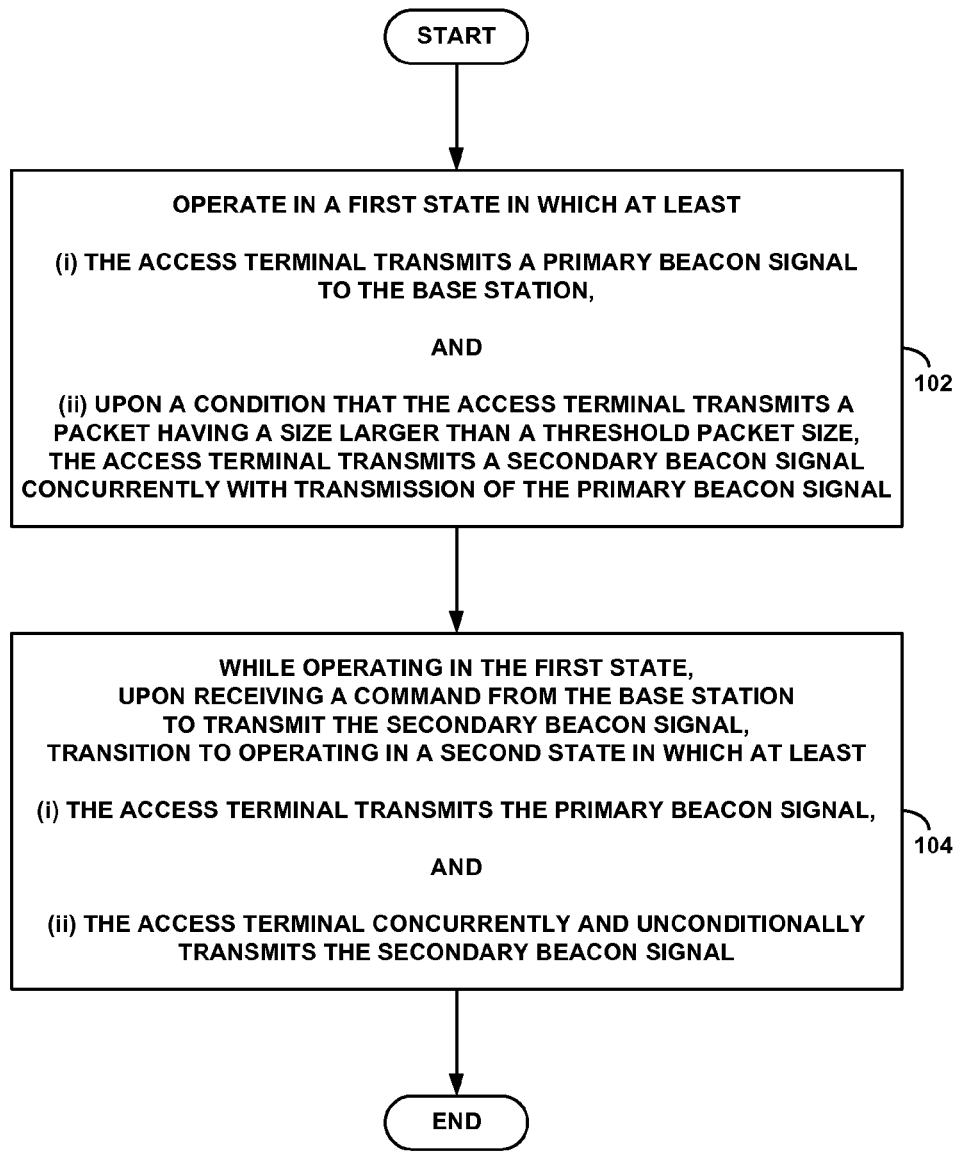
FIG. 1 is a flowchart illustrating an example embodiment of enhanced reverse-link auxiliary pilot triggering in an access terminal.

FIG. 1 is a flowchart illustrating an example embodiment of enhanced reverse-link auxiliary pilot triggering as implemented in an access terminal. By way of example, the steps of the flowchart could be implemented in an access terminal in a wireless communication system that includes a base station, and that operates according to a CDMA family of protocols. At step 102, the access terminal operates in a first state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal. In accordance with the example embodiment, the first state could correspond to an "active state" in which the access terminal is engaged in a communication session or call via the base station. In such an active state, the AT's behavior as described in connection with step 102 helps maintain robustness of operation.

Note that the characterization of the first state in terms of transmission of the primary beacon and the conditional transmission of the secondary beacon should not be viewed as limiting the first state to only the two described behaviors. The first state could include other behaviors as well, provided those other behaviors don't contradict or are not mutually exclusive with the two explicitly-described behaviors of the first state. Further, since the transmission of the secondary beacon signal is conditioned on transmitted packet size, it is possible for an access terminal to operate in the first state and not transmit its secondary beacon signal if the condition is not met.

For an AT and base station operating according to IS-856, for instance, the primary beacon signal could be the primary pilot transmitted by the AT on its reverse link to the base station. The pilot signal of an AT is used by the AT's serving base station, among other purposes, to establish and maintain a timing reference for the AT, which then facilitates decoding by the base station of other signals sent by the AT on its reverse link. In accordance with the present example embodiment, the secondary beacon signal could then be an auxiliary pilot. The auxiliary pilot is identical to the primary pilot, except that it is transmitted at a lower power level. Transmission of the auxiliary pilot therefore effectively boosts the power of the primary pilot as received by the base station. In so doing, the precision and reliability of base station's timing reference for the AT is enhanced, thereby enhancing the reliability of decoding of the AT's reverse-link signals. In practice, the power level of each of the primary and auxiliary pilot is specified as a gain level, x, according to the relation $x$ dBm=$10 \log_{10}(P/1 \text{ mW})$, where P is the power in mW (milliwatts). However, other power units could be used.

In further accordance with the example embodiment, the condition that the access terminal transmits a packet having a size larger than a threshold packet size corresponds to a condition that the access terminal transmits a packet having a payload size larger than a threshold payload size. Under IS-856 (and other CDMA-related protocols), the payload size on the reverse link corresponds to an amount of data transmitted per unit time (e.g., bits per second). The higher the amount of data per unit time (i.e., the larger the payload size), the more important the need for a precise and reliable timing reference at the base station. Hence, activating, or "triggering," the auxiliary pilot for payload sizes exceeding the threshold size helps ensure that the base station will have a precise and reliable timing reference when it needs it. In a wireless communication system that operates according to a CDMA family of protocols including IS-856, the threshold packet size corresponds to a value of a system parameter referred to as "AuxiliaryPilotChannelMinPayload." Accordingly, the threshold condition of step 102 could be based on a comparison of payload size to AuxiliaryPilotChannelMinPayload.

At step 104, while operating in the first state described at step 102, upon receiving a command from the base station to transmit the secondary beacon signal, the access terminal transitions to second state in which at least (i) the access terminal transmits the primary beacon signal, and (ii) the access terminal concurrently and unconditionally activates and transmits the secondary beacon signal. In accordance with the example embodiment, the second state could correspond to the same active state as the first state, except that transmission of the secondary beacon is unconditional in the second state.

Similarly to the first state, the characterization of the second state in terms of transmission of the primary beacon and the (now) unconditional transmission of the secondary beacon should not be viewed as limiting the second state to only the two described behaviors. The second state could include other behaviors as well, provided those other behaviors don't contradict or are not mutually exclusive with the two explicitly-described behaviors of the second state.

In accordance with the example embodiment, the command from the base station could be received as part of a first message transmitted from the base station to the access terminal. Further, receiving the first message could be an indication that particular signals transmitted from the access terminal have been detected below a first threshold level at the base station. More specifically, the base station could comprise a given coverage area including a given cell and/or a given sector, and the particular signals transmitted from the access terminal could comprise one or more "Data Rate Control" (DRC) messages transmitted to the given coverage area in accordance with IS-856 to advise the given coverage area of a forward-link data rate to use on upcoming transmissions to the access terminal. Accordingly, the indication that the particular signals transmitted from the access terminal have been detected below the first threshold level at the base station could comprise an indication that an error rate in the reception of DRC messages at the given coverage area exceeds a first threshold rate. In practice, the error rate in the reception of DRC messages is measured as a "DRC erasure rate" by a cell or sector in an IS-856-compliant system.

Under conventional EVDO operation, a sector (or other form of coverage area) will transmit a "DRC Lock" message with a bit set when the DRC erasure rate for a particular AT exceeds a threshold rate. A typical value for the threshold rate is one percent, though other values could be used. Setting the DRC Lock bit advises the AT that the sector will suspend communications with the AT, and that the AT should use an alternate coverage area for communications, wherein an alternate coverage area could comprise an alternate sector, an alternate cell, or an alternate base station, for example. However, in accordance with the example embodiment, the sector will instead instruct an AT operating in the first state to unconditionally turn on and transmit its auxiliary pilot if the DRC erasure rate exceeds the first threshold rate. Advantageously, the enhanced signal strength of the AT's pilot may then allow the sector to successfully receive sufficiently many DRC messages to reduce the DRC erasure rate below the first threshold rate, and consequently enable the serving sector to continue to communicate with the AT. In responding to the command from the serving sector by turning on and transmitting its auxiliary pilot, the AT will have transitioned from the first state to the second state.

In the discussion of FIG. 1, as well as in other discussions and explanations herein, the terms "first" and "second" as applied to "states," "messages," "thresholds," and the like, are used as identifying labels, and not meant to imply any numerical ordering (although a numerical ordering is not necessarily excluded). It will also be appreciated that the steps of FIG. 1 are exemplary, and that additional and/or alternative steps or alternative ordering of steps could be carried out and still remain within the scope and spirit of the present invention.

Figure 2:
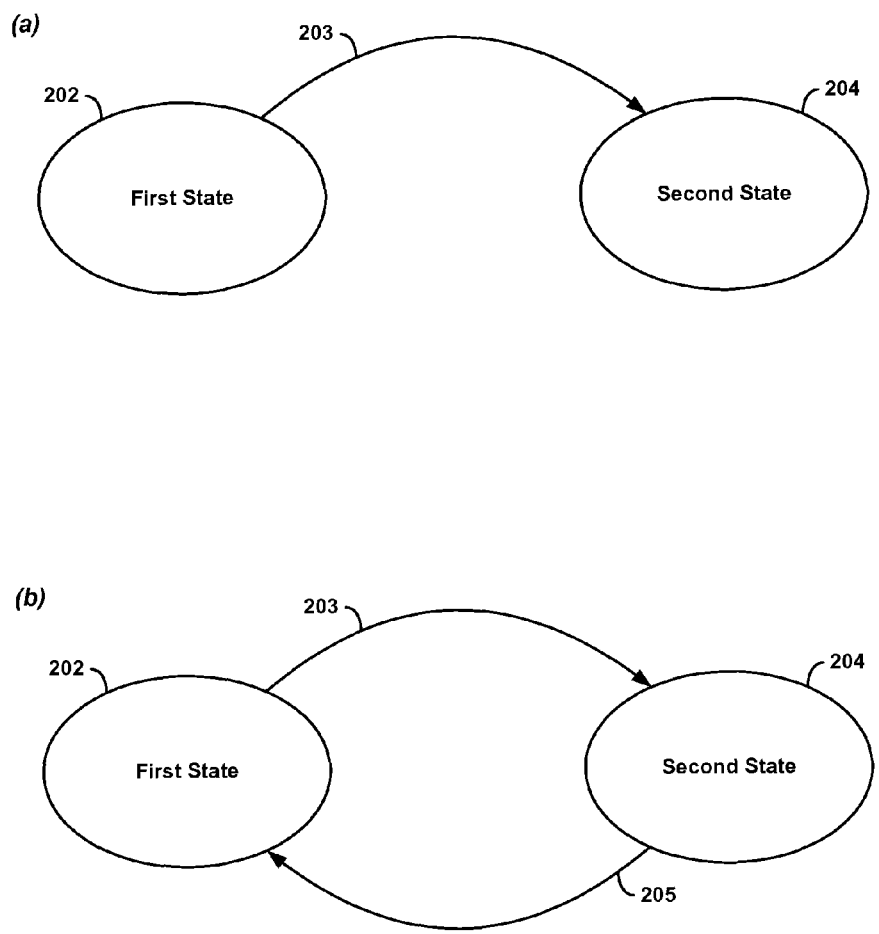
FIG. 2 is a state diagram illustrating an example embodiment of enhanced reverse-link auxiliary pilot triggering in an access terminal.

Further aspects of the example embodiment may be understood by referring to FIG. 2, which provides a simple illustration of the first and second states and the transitions between them. In panel (a) at the top, an access terminal is operating is the first state 202, wherein operation in the first state is characterized according to the description above of step 102 in FIG. 1. Upon receiving the command from the base station to transmit the auxiliary pilot, the access terminal makes a transition 203 to the second state 204, wherein second state is characterized according to the description above of step 104 in FIG. 1.

The bottom panel (b) of FIG. 2 again includes the first state 202, the second state 204, and transition 203 from the first to the second state, but also includes a transition 205 from the second back to the first state. In accordance with the example embodiment discussed above, the transition 205 back to the first state could be made by the AT in response to further communications received from the base station (or sector). By way of example, while the AT is in the second state, transmitting both its primary and auxiliary pilots, it may happen that the DRC erasure rate measured at the serving sector (or base station) remains above the first threshold rate or alternatively crosses above a second, higher threshold rate. Consequently, the serving sector may then send a DRC Lock message with the bit set. In this case, upon receiving the DRC Lock message, the AT will transition 205 to the first state 202, cease communicating with the serving sector, and seek access from a different sector (or other form of coverage area) in order to continue the active communication session.

As another example, while operating in the second state, the AT may receive a command from the base station to cease unconditional transmission of the auxiliary pilot. In responding to the command, the AT would then transition 205 back to the first state 202. In further accordance with the example embodiment, the command to cease unconditional transmission of the auxiliary pilot could be included in a second message transmitted by the base station, and indicating that RF conditions on the reverse link have improved sufficiently so as to no longer require transmission of the AT's auxiliary pilot. More specifically, while the AT is operating in the second state, the serving sector may determine that the DRC erasure rate no longer exceeds the first threshold rate, or alternatively, has fallen below a third, smaller threshold rate. In this case, the AT will transition back to the first state and continue communicating with the serving sector.

Figure 3:
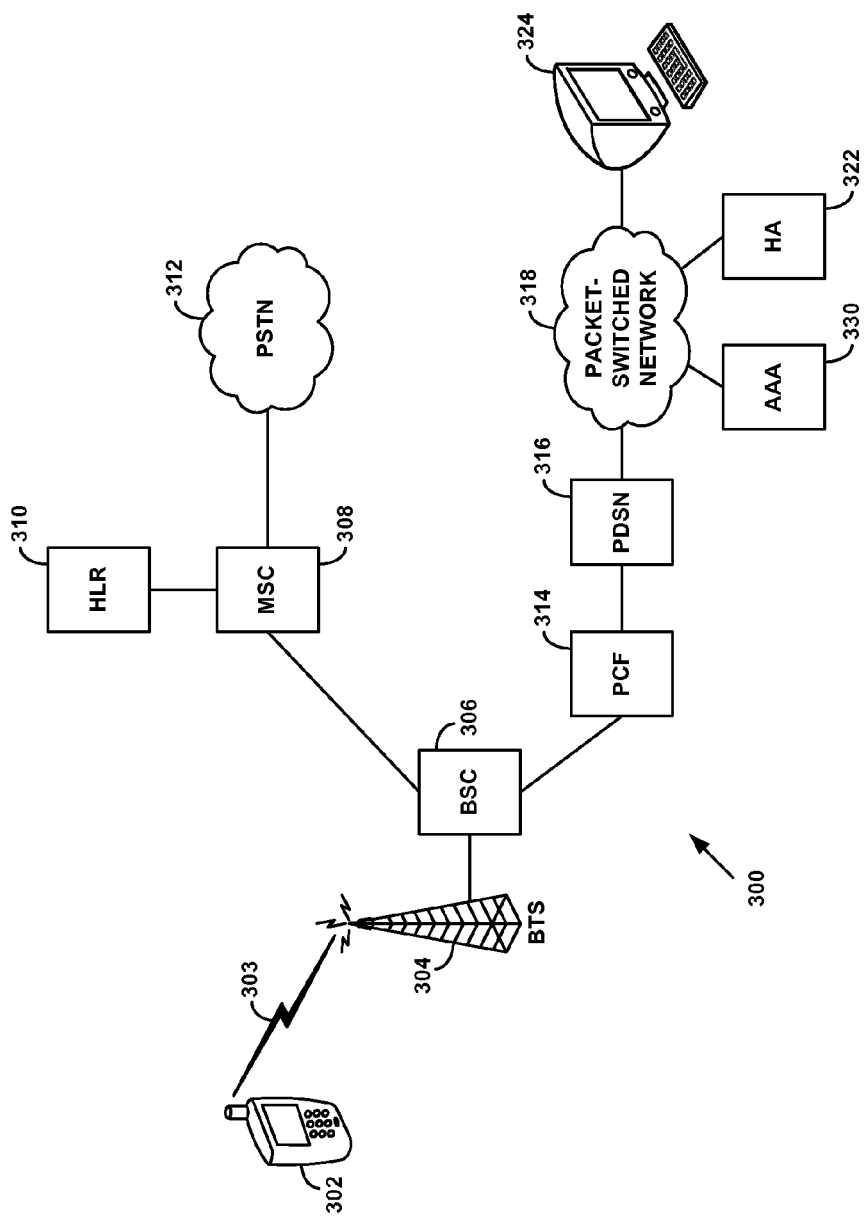
FIG. 3 is a simplified block diagram of a wireless communication system in which an example embodiment of enhanced reverse-link auxiliary pilot triggering can be employed.

FIG. 3 shows a simplified block diagram of a wireless communication system 300 in which an example embodiment of enhanced reverse-link auxiliary pilot triggering can be employed. Access terminal AT 302 communicates over an air interface 303 with a BTS 304, which is then coupled or integrated with a BSC 306. Transmissions over air interface 303 from BTS 304 to AT 302 represent the forward link to the access terminal (also referred to herein alternatively as the forward link from the base station, and as "the AT's forward link"). Transmissions over interface 303 from AT 302 to BTS 304 represent the "reverse link" (also referred to herein as "the AT's reverse link"). It will be appreciated that the arrangement shown in the figure is illustrative.

BSC 306 is connected to MSC 308, which acts to control assignment of air traffic channels (e.g., over air interface 303), and provides access to wireless circuit-switched services such as circuit-voice and circuit-data (e.g., modem-based packet data) service. As represented by its connection to PSTN 312, MSC 308 is also coupled with one or more other MSCs or other telephony circuit switches in the operator's (or in a different operator's) network, thereby supporting user mobility across MSC regions, and local and long-distance landline telephone services. Also connected to MSC 308 is home location register (HLR) 310, which supports mobility-related aspects of subscriber services, including dynamic tracking of subscriber registration location and verification of service privileges.

As shown, BSC 306 is also connected with a PDSN 316 by way of packet control function (PCF) 314. PDSN 316 in turn provides connectivity with a packet-switched network 218, such as the Internet and/or a wireless carrier's private core packet-network. Sitting as nodes on network 318 are, by way of example, an authentication, authorization, and accounting (AAA) server 320, a mobile-IP home agent (HA) 322, and a remote computer 324. After acquiring an air traffic channel over its air interface, an access terminal (e.g., AT 302) may send a request to PDSN 316 for a connection in the packet data network. Then, following authentication of the access terminal by AAA server 320, the access terminal may be assigned an IP address by the PDSN or by HA 322, and may thereafter engage in packet-data communications with entities such as remote computer 324.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention or embodiments thereof. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 302 typically comprises a user-interface, I/O components, a transceiver, a communication interface, a tone detector, a processing unit, and data storage, all of which may be coupled together by a system bus or other mechanism. As such, system 300, AT 302, and air interface 303 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With arrangement described above, an access terminal can engage in cellular voice or packet-data communications. Referring again to FIG. 3, and taking an originating call from AT 302 as an example, AT 302 first sends an origination request over air interface 303 and via the BTS 304 and BSC 306 to MSC 308. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 316 by way of PCF 314. The PDSN 316 and access terminal 302 then negotiate to establish a data link layer connection, such as a point to point protocol (PPP) session. Further, the PDSN 316 sends a foreign agent advertisement that includes a challenge value to the access terminal, and the access terminal responds with a mobile-IP registration request (MIP RRQ), including a response to the challenge, which the PDSN forwards to HA 322. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a "reverse activity bit" (RAB) sub-channel, a DRC Lock sub-channel, an ARQ sub-channel, and a "reverse power control" (RPC) sub-channel. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset.

As noted, the IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT.

Under IS-856, an access terminal communicates with the network via just one "serving" sector any given time. Typically the AT's serving sector is the "best" sector of its active set at the given time, and the process of handing off from one serving sector to another from the active is referred to as "virtual soft handoff." As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

As noted, the IS-856 reverse-link MAC channel includes a DRC sub-channel that is used by the AT to indicate the supportable forward-link data rate and desired serving sector for the forward link. More specifically, the DRC channel carries a DRC message that encodes the requested forward-link data rate and identifies an active-sector sector from which the AT seeks forward-link communication. The AT determines the supportable forward-link data rate based on a detected signal strength of its active-set sectors, usually measured as a signal-to-interference-plus-noise ratio ("SINR"). In practice, the AT uses the measured SINR of its best active-set sector to select one of several pre-determined data rates in a look-up table, each rate being designated by a four-bit "DRC symbol" in the table. The AT encodes the selected DRC symbol into a DRC message, and transmits the DRC message, further encoded to indicate the PN offset of the desired serving sector (as selected from the AT's active set according to SINR).

Due to imperfect transmission, the serving sector identified in the DRC message may not be able to properly decode the received DRC message. When this happens, the sector "erases" the message, thereby precluding an upcoming forward-link transmission (e.g., one or more time slots) to the access terminal at a possibly erroneous data rate. Over the course of sliding time windows, the sector tracks a DRC erasure rate as a ratio of the number of DRC erasures to the total number of DRC messages received. If the DRC erasure rate remains below a threshold rate, the sector continues to serve the AT, albeit with possible interruptions due to DRC erasures. Under conventional operation, if the DRC erasure rate exceeds the threshold rate, the sector transmits a DRC Lock message with a bit set to indicate that the sector will suspend communications the AT. In this instance, the AT must seek service from an alternate sector in its active set, possibly at a lower data rate than the AT had requested of the serving sector that transmitted the DRC Lock message.

For the purposes of the discussion herein, the term "DRC Lock set message" shall be used to refer a DRC Lock message with the bit set to indicate that the sector will suspend communications with the AT. Conversely, the term "DRC Lock clear message" shall be used to refer to a DRC Lock message with the bit set to indicate that the sector is measuring a sufficiently low rate of DRC erasures so as to continue serving the AT. As such, the bit setting of a DRC Lock set message is opposite that of a DRC Lock clear message. Note that the actual bit value of one or zero in DRC Lock messages may be implementation-specific, so long as the value is binary-opposite for the two types of DRC Lock messages.

Operation in an IS-856 compliant communication system may be illustrated, again with reference to FIG. 3. To acquire packet data connectivity under IS-856, after an access terminal first detects an IS-856 carrier, the access terminal sends to its BSC (or RNC) 306 a UATI (Universal Access Terminal Identifier) request, and receives in response an UATI, which the access terminal can then use to identify itself in subsequent communications with the BSC. The access terminal then sends a connection-request to the BSC 306, and the BSC responsively invokes a process to authenticate the access terminal and to have the access terminal acquire a data link.

In particular, the BSC 306 sends an access request to an Access Network AAA (ANAAA) server (which may be different than the AAA server 320), and the ANAAA server authenticates the access terminal. The BSC 306 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 316 (via PCF 314), and the PDSN and access terminal then negotiate to establish a PPP data link. In addition, as in the IS-2000 process, the access terminal then sends an MIP RRQ to the PDSN, which the PDSN forwards to the HA 322, and the HA assigns a mobile-IP address for the access terminal to use.

Once the access terminal has acquired an IS-856 radio link, a data link, and an IP address, the access terminal is considered to be in an active mode (or state). In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. Auxiliary Pilot Trigger a. Operating Principles

As described above, under IS-856 the reverse link consists of an access channel and a traffic channel. The traffic channel is further subdivided into a pilot channel, a MAC channel, and ACK channel and a data channel. The MAC channel further includes a reverse rate indicator (RRI) channel and a DRC channel. The transmission power applied to each of these channels is tied (or linked) to that of the pilot channel. Revision A of the IS-856 standard also introduces an auxiliary pilot channel to the reverse link traffic channel, as described above. An access terminal responds to power-management commands from its serving sector by adjusting the power of its pilot signal (i.e., the gain applied to its pilot channel). At the same time, the power applied to each of the other channels is scaled in relation to the pilot signal, such that the relative gain of each channel with respect to that of the pilot channel is kept fixed. For example, in typical operation, the reverse ACK channel is transmitted at 3 dB higher than the pilot channel (twice the pilot signal power), the RRI channel is transmitted at the same gain as the pilot channel (same power as the pilot signal), and the data channel is transmitted 3 dB lower (½ the pilot signal power). Note that using a fixed gain factor with respect to the gain of the pilot channel is equivalent to using a fixed power ratio with respect to the power of the pilot channel.

The data rate achievable on the reverse link depends on a combination of factors, including noise characteristics of the reverse link as reported to the AT by the base station, the amount of data to be sent by the AT, and the amount of reverse-link power the AT has to spare ("head room"). In turn, the data rate will be used to determine the size of the payload of link-layer packets sent from the AT to the base station. A higher achievable data rate supports higher-density coding, and hence more data symbols per frame and a correspondingly larger payload size. Conversely, a smaller data rate accommodates lower-density coding and thus a smaller payload size.

The ability of the base station to correctly decode a packet received from a given AT depends on the quality and reliability of the base station's timing reference for the AT, which, in turn, depends (at least in part) on the strength of the AT's pilot signal. In particular, as payload size grows with the data rate on an AT's reverse-link data channel, the importance of a reliable timing reference for that AT at the serving base station correspondingly increases. To help ensure the requisite reliability, an AT turns its auxiliary pilot on and off according to the payload size that the AT transmits on its reverse-link data channel. Specifically, in conventional operation under IS-856, Rev. A, a system-wide threshold of payload size is set according to a single, system-wide parameter called "AuxiliaryPilotChannelMinPayload" such that an access terminal will turn on its auxiliary pilot whenever the AT starts transmitting link-layer packets with payloads at least as large as the threshold. The AT will subsequently turn off its auxiliary pilot if the payload size drops below the threshold. With the introduction of the auxiliary pilot, the nominal pilot is re-designated as the "primary pilot" signal (or channel).

When switched on, an AT's auxiliary pilot is conventionally transmitted at a fixed gain below that of the primary pilot, typically at −9 dB with respect to the gain of the primary pilot (although other values, usually in a range from 0 dB to −15 dB, could be used). Except for the reduced power level with respect to the primary, however, the auxiliary pilot is identical the primary pilot. Thus, the primary and auxiliary pilots are effectively additive to a single pilot signal that is identical to either one of them but having their combined transmission power. From the perspective of the serving the base station, the AT appears to be transmitting a stronger pilot signal when its auxiliary pilot is switched on. In turn, the base station's timing reference for the AT is made more precise and reliable.

b. Reverse-Link Auxiliary Pilot Triggering Base on DRC Erasure Rate

While use of a threshold packet size to determine whether or not an AT should switch its auxiliary pilot on or off can help ensure reliable decoding of data by the base station, the relative benefits of the auxiliary pilot also depend on proper setting of the threshold. In practice, AuxiliaryPilotChannelMinPayload is a relatively static system parameter, being adjusted possibly only from time to time. Consequently, triggering the auxiliary pilot based on a comparison of payload size to AuxiliaryPilotChannelMinPayload does not allow an access terminal to directly account for dynamic conditions of its RF link to its serving base station (or sector). At the same time, the DRC erasure rate measured by an AT's serving base station (or sector) does provide a direct indication of the operating conditions of the RF link. Accordingly, embodiments of the present invention provide enhanced reverse-link auxiliary pilot triggering based on the DRC erasure rate.

In accordance with an example embodiment, while in an active EVDO communication session, an access terminal and its serving base station (or other form of coverage area, such as a cell or sector) will act in a coordinated/cooperative manner to cause the AT's auxiliary pilot to be triggered based on dynamically-determined RF conditions, as ascertained from the DRC erasure rate. More specifically, the serving sector of the AT will track the DRC erasure rate associated with the AT according to conventional sector operation. However, if and when the DRC erasure rate exceeds a first threshold rate, the serving sector will, rather than transmit a DRC Lock set message, instead transmit a command to the AT to turn on its auxiliary pilot. Correspondingly, the AT, upon receiving a command from its serving sector to turn on its auxiliary pilot, will activate and transmit its auxiliary pilot unconditionally and independently of the payload size of the packets it transmits.

In further accordance with the example embodiment, after a configurable time period that begins subsequent to transmitting the command to the AT to turn on its auxiliary pilot, the serving sector will take additional action if the DRC erasure rate exceeds a second threshold rate or falls below a third threshold rate. More particularly, if the DRC erasure rate is determined to exceed the second threshold rate, wherein the second threshold rate is at least as large as the first threshold rate, then the serving sector will transmit a DRC Lock set message to the AT. Correspondingly, the AT will revert to conventionally operating its auxiliary pilot (i.e., conditioned on packet payload size), and will seek access from an alternate sector (i.e., conventional operation with respect to receipt of a DRC Lock set message). If instead the DRC erasure rate is determined to fall below the third threshold rate, wherein the third threshold rate is no larger than the first threshold rate, then the serving sector will transmit a command to the AT to cease unconditional transmission of its auxiliary pilot. Correspondingly, the AT will revert to conventionally operating its auxiliary pilot (i.e., conditioned on packet payload size), but continue to communicate with the serving sector.

As described, the first, second, and third threshold rates can be characterized in the example embodiment according to: third threshold rate≦first threshold rate≦second threshold rate. In view of this relation, the first threshold rate shall be referred to herein as the "mid-mark" threshold rate, the second threshold rate shall be referred to herein as the "high-mark" threshold rate, and the third threshold rate shall be referred to herein as the "low-mark" threshold rate. The above relation then becomes: low-mark threshold rate≦mid-mark threshold rate≦high-mark threshold rate. The configurable time period that begins after the serving sector transmits the command to the AT to turn on its auxiliary pilot serves the purpose allowing the addition of auxiliary pilot transmission time to take effect and potentially reduce the DRC erasure rate.

In accordance with the example embodiment, the low-mark and high-mark threshold rates provide a range about the mid-mark threshold to help avoid causing an access terminal to "ping-pong" between the first and second operational states. Thus, while a detection of a DRC erasure rate above the mid-mark threshold rate will trigger a serving sector to command the associated AT to unconditionally transmit its auxiliary pilot, and thereby transition to the second state, the DRC erasure rate will need to subsequently exceed the high-mark threshold or drop below the low-mark threshold before the serving sector issues a command that will cause the AT to return to the first state.

By way of example the mid-mark threshold rate could be 1.0 percent, the high-mark threshold rate could be 1.5 percent, and the low-mark threshold could be 0.75 percent. It will be appreciated that other values could be used. Further, after issuing a command to an AT to unconditionally transmit its auxiliary pilot, the serving sector could wait for a configurable time period before comparing the observed DRC erasure rate with the low-mark and/or high-mark threshold rates. This would allow time for the addition of the auxiliary pilot to have an effect on the DRC erasure rate. By way of example the configurable time period could be 32 time slots, although other values could be used. The threshold rates and the configurable time period could be adjusted in a coordinated manner so as to optimize the beneficial effect of triggering the auxiliary pilot based on DRC erasure rate. For example, all three threshold rates could be set to the same value by extending the configurable time period. Alternatively, the time period could be made short by setting the low-mark and high-mark threshold to define a wider range about the mid-mark threshold. Other configurations of thresholds and the time period could also be used.

In further accordance with the example embodiment, the threshold rates and the configurable time period could be set on a per-access-terminal basis. This would advantageously introduce a form of tiered service based on the settings of these parameters. For example, a more aggressive triggering of auxiliary pilot (e.g., a lower setting of the mid-mark threshold rate, broader range about the mid-mark rate, etc.) could be associated with a higher tier of service. Conversely, a less aggressive triggering of auxiliary pilot (e.g., a higher setting of the mid-mark threshold rate, narrower range about the mid-mark rate, etc.) could be associated with a lower tier of service. Service tiers could be based on the identity of subscribers associated with access terminals, type of application running on access terminals (e.g., real-time, best-effort, etc.), or both. Additionally, the threshold rates and the configurable time period could also be set on the basis of sector, cell, BTS, BSC, RAN, or some combination of any or all of these. The settings could also be dynamically adjustable based on traffic load conditions, time of day, or other dynamic operational factors.

c. Example Operation

Figure 4:
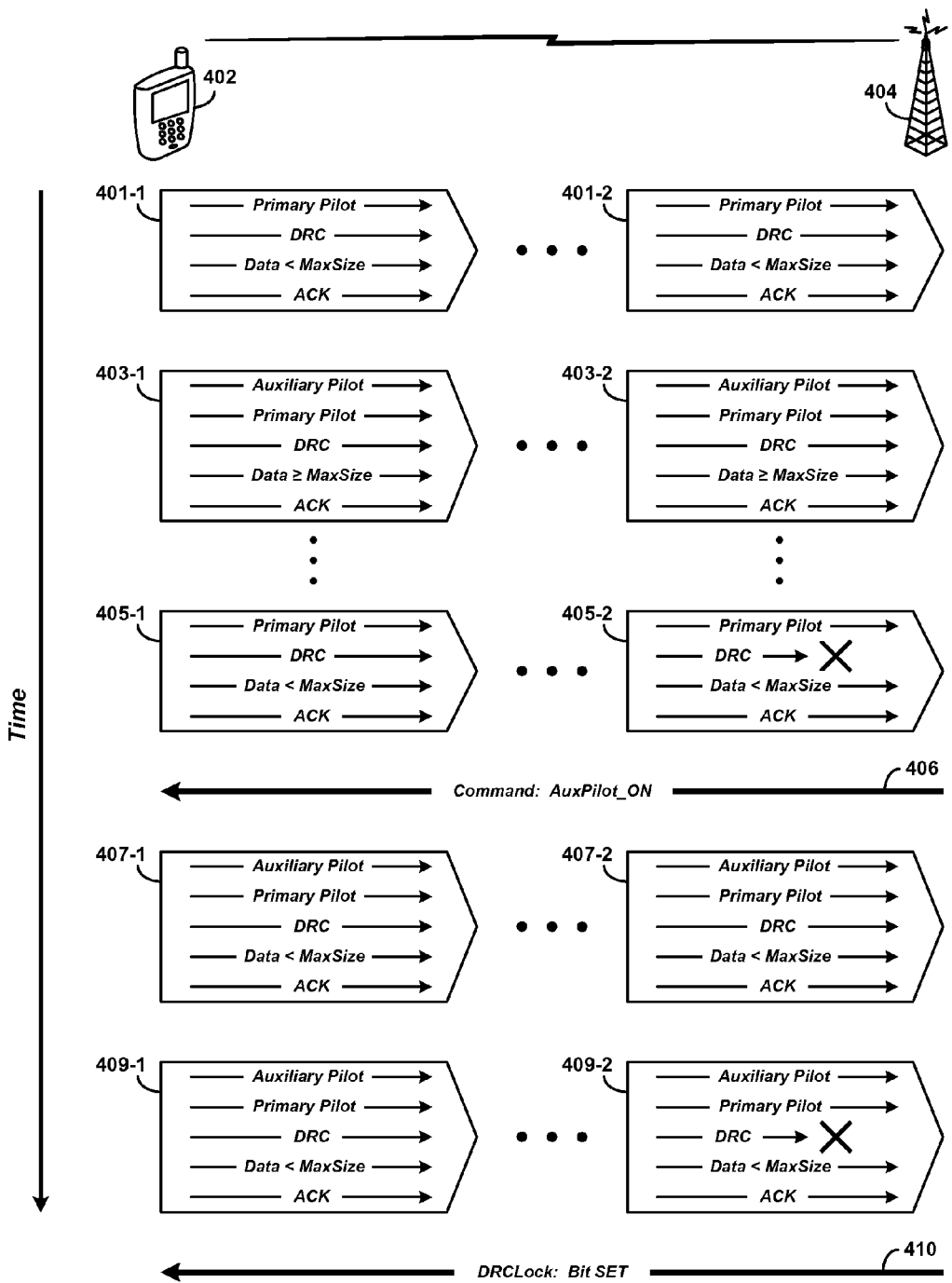
FIG. 4 illustrates an example embodiment of enhanced reverse-link auxiliary pilot triggering in an access terminal in terms of reverse-link channel operation.

The example embodiment may be further understood operationally in terms of actions and methods carried out by each of an access terminal and the serving sector (or base station), with reference to FIG. 4. In the figure, by way of example, an access terminal 402 is depicted as having an active EVDO communication session via a serving sector 404. As such, the AT has a reverse-link traffic channel consisting of specific sub-channels, as described above. A number of reverse-link traffic-channel transmissions are represented as broad arrows in FIG. 4, each depicted as containing particular reverse-link sub-channels (thin, black arrows) and collectively illustrating salient aspects of the example embodiment. As shown, the access terminal 402 is on the left of the figure, the serving sector 404 is on the right, and time increases from the top to the bottom.

At the top of the figure, a transmission 401-1 from the AT is depicted as comprising a primary pilot channel, a DRC channel, a data channel, and an ACK channel. In accordance with the example embodiment, the AT may be considered as operating in a first state in which it transmits its primary pilot, while switching its auxiliary pilot on and off conditionally, based on a comparison of packet payload size to AuxiliaryPilotChannelMinPayload. As indicated by the data-channel designation "Data<MaxSize," the transmission 401-1 comprises a payload size that is evidently smaller than AuxiliaryPilotChannelMinPayload. Hence, only the primary pilot transmitted at this point. After a propagation delay (indicated by horizontal ellipses to the right of transmission 401-1), the serving sector 404 receives the transmission, relabeled as transmission 401-2 and comprising the same four channels.

At a later point in time, a transmission 403-1 from the AT is depicted as comprising a primary pilot channel, a DRC channel, a data channel, an ACK channel, and an auxiliary pilot channel. In further accordance with the example embodiment, the AT may be considered as still operating in a first state, but with packet payload size that now evidently exceeds AuxiliaryPilotChannelMinPayload. This is indicated by the data-channel designation "Data≧MaxSize" in the transmission 403-1. Consequently, both the primary pilot and the auxiliary pilot are transmitted at this point. After a propagation delay (indicated by horizontal ellipses to the right of transmission 403-1), the serving sector 404 receives the transmission, relabeled as transmission 403-2 and comprising the same five channels.

At a yet later time (indicated by vertical ellipses), a transmission 405-1 is from the AT is depicted as comprising a primary pilot channel, a DRC channel, a data channel, and an ACK channel. Again, the AT may be considered as operating in a first state, but once more with packet payload size that evidently is smaller than AuxiliaryPilotChannelMinPayload, as indicated by the data-channel designation "Data<MaxSize" in the transmission 405-1. Consequently, only the primary pilot is transmitted at this point. After a propagation delay, the serving sector 404 receives the transmission 405-2, but this time, as indicated by the "x" in front of the arrow representing the DRC channel, the DRC message is evidently not properly decoded. More particularly, the "x" in front of the arrow representing the DRC channel is intended to represent a DRC erasure rate that exceeds a mid-mark threshold rate. That is, the fraction of all DRC messages within a given time window that have resulted in DRC erasures exceeds a mid-mark threshold fraction.

In accordance with the example embodiment, the serving sector 404, in response to determining that the DRC erasure rate exceeds the mid-mark threshold, transmits a command to the AT 402 to turn on its auxiliary pilot. The command shown as a thick, black, leftward-pointing arrow 406 labeled "Command: AuxPilot_ON." This command could be sent in a first message that identifies the access terminal and is transmitted on an existing forward link MAC sub-channel. For example, the first message could be transmitted on the DRC Lock sub-channel by defining a new state (in addition to the conventional "lock/unlock" state) for "Auxiliary Pilot Trigger" with values "AuxPilot_ON" and "AuxPilot_OFF." Alternatively, the ARQ or RPC sub-channels could be used by similarly defining a new state. As another alternative, an AT-specific asynchronous message could be transmitted on the reverse-link control channel or piggy-backed on the reverse-link traffic channel. It will be appreciated that the terminology "AuxPilot_ON," "AuxPilot_OFF," and "Command: AuxPilot_ON" are examples, and other nomenclature could be used, as could other means for transmitting the first message.

In further accordance with the example embodiment, upon receiving the first message, the AT 402 will transition to a second state in which it unconditionally transmits its auxiliary pilot. This is represented in FIG. 4 in transmission 407-1, which is depicted as comprising both a primary pilot channel and an auxiliary pilot channel (as well as a DRC channel and an ACK channel), but with a data channel carrying a payload size no larger than AuxiliaryPilotChannelMinPayload, as indicated by the data-channel designation "Data<MaxSize." Thus, the AT will activate and transmit its auxiliary pilot independently of packet payload size in response to receiving the first message from the serving sector.

After a propagation delay (indicated by horizontal ellipses to the right of transmission 407-1), the serving sector 404 receives the transmission, relabeled as transmission 407-2 and comprising the same five channels. Advantageously, the addition of the auxiliary pilot can enhance the reliability of the timing reference used by the base station (or serving sector in the present example), thereby enabling the base station to correctly decode a higher percentage of the AT's DRC messages and avoid or at least forestall conditions for issuing a DRC Lock set message to the AT. Put another way, transmission of the auxiliary pilot may result in a DRC erasure rate sufficiently small to avoid triggering a DRC Lock set message from the base station. In turn, the base station may continue serving the AT, allowing the EVDO data session to be maintained without forcing the AT to seek an alternate serving base station (or serving sector).

If the DRC erasure rate continues to grow or remains sufficiently high even after the AT begins unconditional transmission of its auxiliary pilot, the serving base station may then transmit a DRC Lock set message, in accordance with conventional operation. This is illustrated in FIG. 4 in transmissions 409-1 and 409-2, which are depicted as comprising the same channels as transmissions 407-1 and 407-2, respectively, except that the DRC channel in the received transmission 409-2 is evidently subject to an excessive DRC erasure rate. As with transmission 405-2, the high erasure rate is represented in transmission 409-2 by the "x" in front of the arrow representing the DRC channel.

In accordance with the example embodiment, the excessive erasure rate represented in transmission 409-2 corresponds to a DRC erasure rate at or above a high-mark threshold rate, wherein the high-mark threshold rate is at least as large as the mid-mark threshold rate. In response to determining that the DRC erasure rate exceeds the high-mark threshold rate, the serving sector transmits a DRC Lock set message to the AT. This message is shown as a thick, black, leftward-pointing arrow 410 labeled "DRCLock: Bit Set." The serving sector will also suspend communication with the AT. Upon receiving this message, the AT will transition back to operating in the first state, and will also seek service from an alternate sector.

Although not illustrated in FIG. 4, after transmitting the command 406 to the AT to turn on its auxiliary pilot, the serving may subsequently determine that the DRC erasure rate has fallen below a low-mark threshold rate. If this occurs, the serving sector will transmit a command to the AT to cease unconditional transmission of its auxiliary pilot. For instance, the addition of the AT's auxiliary pilot (as depicted, for example, in transmission 407-1,2) may sufficiently enhance the serving sector's ability to decode transmissions from the AT so as to arrest or reduce the DRC erasure rate. Consequently, the DRC erasure may fall below the low-mark threshold. In response to receiving a command to cease unconditional transmission of its auxiliary pilot, the AT will transition back to operating in the first state, but will continue to communicate via and receive service from the serving sector.

It may also occur that after the AT transitions to operating in the second state, the DRC erasure rate remains between the high-mark threshold rate and the low-mark threshold rate for some period of time. During this time, the AT will continue to communicate via and receive service from the serving sector, while unconditionally transmitting its auxiliary pilot. In this instance, as in the case wherein the DRC erasure rate drops below the low-mark threshold rate, the triggering of the AT's auxiliary pilot based on the DRC erasure rate advantageously provides a "performance safety net" when operating conditions are marginally sub-optimal.

4. Implementation of Example Embodiment

As described above, the example embodiment involves actions and operations carried out by both the access terminal and the base station (or serving sector). As such, the example embodiment may be considered as comprising a "client-side," associated with the access terminal (or other client communication device), and a "system-side," associated with the base station (or BTS cell or sector). The example embodiment can be implemented as executable steps and operations of a client-side method carried out by an access terminal, and as executable steps and operations of a system-side method carried out by a base station (or BTS cell or sector). Implementation of the example embodiment can further be considered as including means for carrying out both the client-side method and the system-side method. An example implementation of both the client-side method and means and the system-side method and means is described below. By way of example, both the access terminal and the base station are taken to be configured to operate according to IS-856 in a similarly-compliant wireless communication system, such as the one described above in connection with FIG. 3.

a. Example Method Implementations (1) Implementation of Client-Side Method

Figure 5:
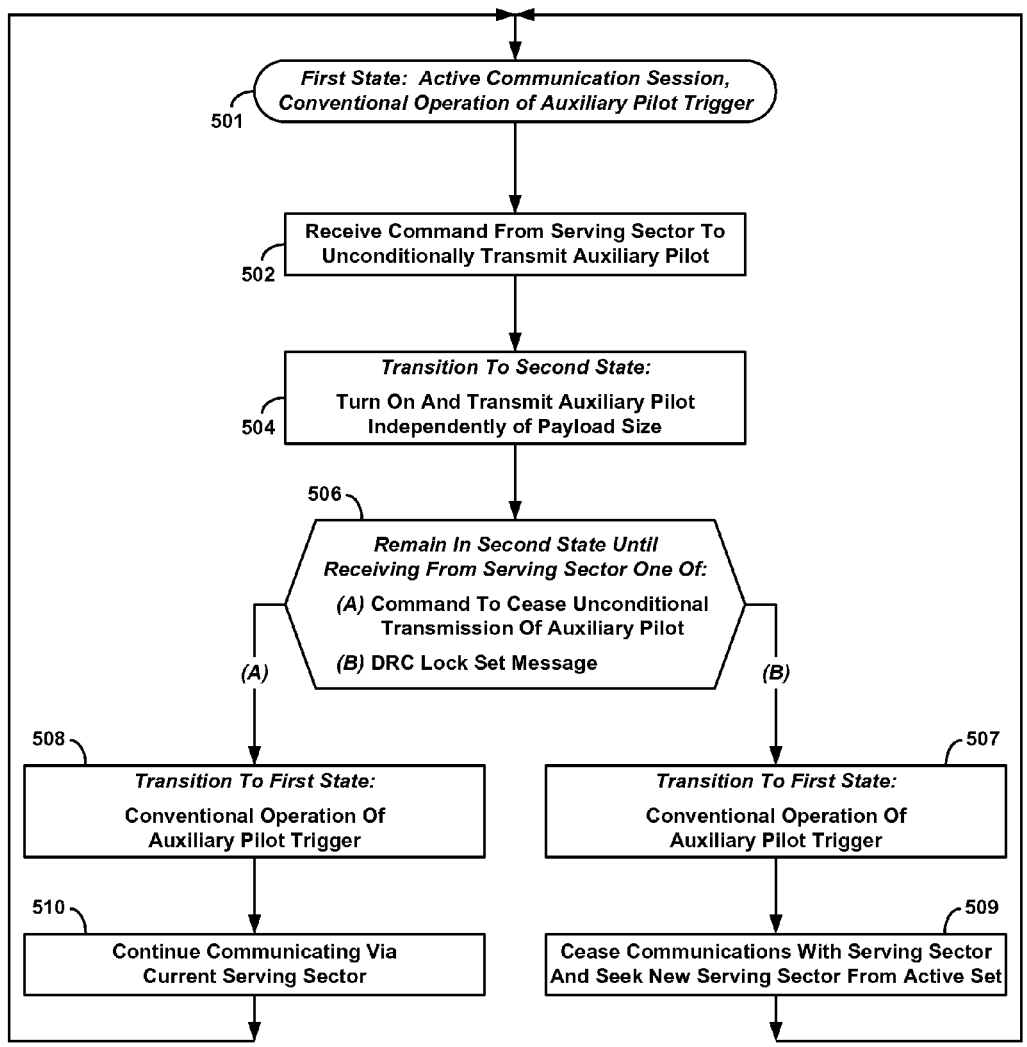
FIG. 5 illustrates example operation of enhanced reverse-link auxiliary pilot triggering as embodied in logical steps implemented in an access terminal.

FIG. 5 is a logical flowchart representing executable steps and operations that could be carried out by an access terminal to implement an example client-side method of enhanced reverse-link auxiliary pilot triggering. At step 501, the AT is operating in the first state described above, operating its auxiliary pilot conventionally (i.e., responsive to packet payload size) while engaged in an EVDO communication session via a serving sector.

At step 502, the AT receives a command from its serving sector to unconditionally transmit its auxiliary pilot. In practice, the AT will receive the command on its air interface with the serving sector. The command could be received in a message on an existing forward-link channel, such as the DRC Lock channel or the RPC channel, whereby the command could represent new message content beyond the current, conventional message content of those channels. Alternatively, the command could be received on an asynchronous control channel.

In response to receiving the command at step 502, the AT transitions to the second state (step 504) described above, by turning on and transmitting its auxiliary pilot unconditionally. Thus in the second state, the AT transmits its auxiliary pilot independently of the payload size of the packets it transmits. Note that the AT could already be transmitting its auxiliary pilot when it receives the command at step 502 if it is already transmitting packets with payload sizes in excess of AuxiliaryPilotChannelMinPayload. In this case, it will continue to transmit its auxiliary pilot, even it starts transmitting packets with payloads below the threshold size.

At step 506, the AT remains in the second state until it receives one of two messages from the serving sector: a command to cease unconditional transmission of its auxiliary pilot, or a DRC Lock set message. These two messages are respectively labeled "(A)" and "(B)" in block 506 for purposes of the present discussion. As with the command to begin unconditional transmission via its auxiliary pilot, the command to cease unconditional transmission of its auxiliary pilot (message (A)) could be received in a message on an existing forward-link channel, again as new (unconventional) message content. The DRC Lock set message (message (B)) is a conventional message, and would be conventionally received on the DRC Lock channel.

Upon receiving a command to cease unconditional transmission of its auxiliary pilot ("(A)" branch from step 506), the access terminal transitions back to the first state (step 508) and continues to communicate via its current serving sector, as indicated at step 510. The AT then returns to step 501, continuing to operate in the first state while communicating via the serving sector. Note that the AT does not change serving sectors in this instance.

Upon receiving a DRC Lock set message ("(B)" branch from step 506), the access terminal transitions back to the first state (step 507 on this branch) and then, as indicated at step 509, ceases to communicate via its current serving sector and instead seeks a new serving sector. Step 509 represents conventional operation with respect to receipt of a DRC Lock set message. The AT then returns to step 501, continuing to operate in the first state while communicating via the new serving sector. Thus, the AT changes to a new serving sector in this instance.

(2) Implementation of System-Side Method

Figure 6:
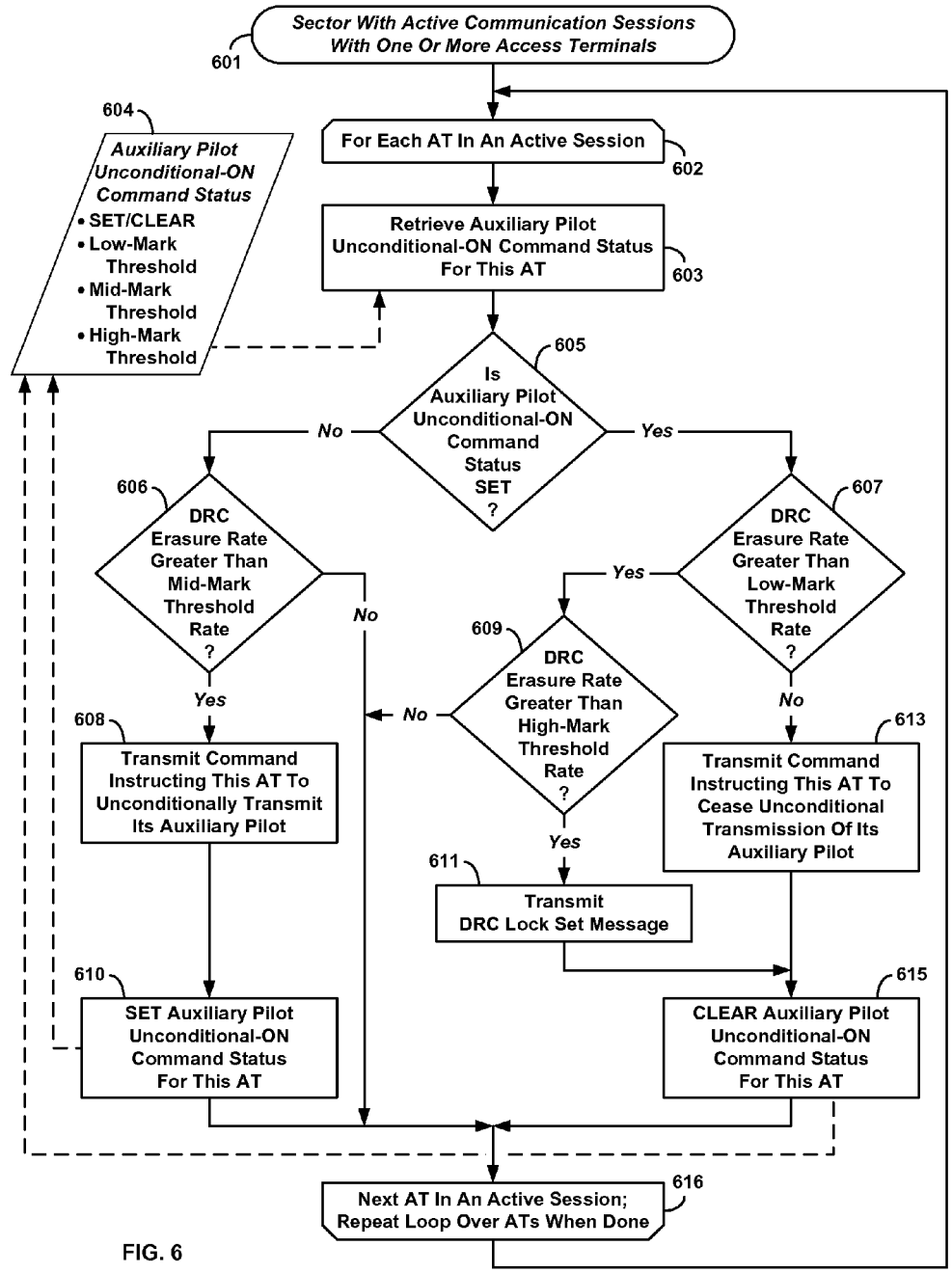
FIG. 6 illustrates example operation of enhanced reverse-link auxiliary pilot triggering as embodied in logical steps implemented in base station.

FIG. 6 is a logical flowchart representing executable steps and operations that could be carried out by a base station (or BTS cell or sector) to implement an example system-side method of enhanced reverse-link auxiliary pilot triggering. Note that the system-side method applies to one or more access terminals that a sector (or base station) may be serving at any given time. Further, although the method may be applied to possibly multiple access terminals served by a sector, it need not be applied to all of the possibly multiple access terminals served by the sector.

At step 601, the sector has active EVDO communication sessions with one or more access terminals. By way of example, the sector applies the method to each of these active terminals in a loop over access terminals, as indicated at step 602. For purposes of this discussion the term "current AT" or "this AT" is used to refer to the access terminal being considered in the current pass through the loop. At step 603, the sector retrieves a status indicator that indicates whether the current AT has already been commanded by the sector to unconditionally transmit its auxiliary pilot. The status indicator is retrieved from status storage 604, the parallelogram labeled "Auxiliary Pilot Unconditional-ON Command Status" in FIG. 6. The dashed arrow from status storage 604 to block 603 represents retrieval of the status indicator.

As shown, status storage 604 includes a "SET/CLEAR" status that is (i) marked as "SET" if the sector has previously sent a command to the current AT to unconditionally transmit its auxiliary pilot, or (ii) marked as "CLEAR" if either no such command has yet been sent or if the sector has previously sent a command to the current AT to cease unconditional transmission of its auxiliary pilot. Status storage 604 also includes a respective value for each of the Low-Mark, Mid-Mark, and High-Mark Threshold rates for the current AT. The retrieval at step 603 of the status indicator includes retrieval of these threshold rates as well. Note that status storage 604 is used to maintain the described information for each access terminal to which the sector applies the method, and the information need not be the same for all the ATs. In practice, status storage 604 could be maintained in physical memory (e.g., random access memory or other form of solid state or disk-based memory) associated with the sector (or base station).

At step 605 the sector uses the status indicator to determine if the current AT has already been commanded to unconditionally transmit its auxiliary pilot; i.e., if the current AT's "Auxiliary Pilot Unconditional-ON Command Status" is SET. If not ("No" branch from step 605), then the sector compares (step 606) the DRC erasure rate for the current AT against the Mid-Mark threshold rate. If the DRC erasure rate does not exceed the Mid-Mark threshold rate ("No" branch from step 606), then no action is taken for the current AT, and the sector proceeds to the next AT in the loop (step 616). If the DRC erasure rate does exceed the Mid-Mark threshold rate ("Yes" branch from step 606), then the sector transmits a command to the current AT instructing it to unconditionally transmit its auxiliary pilot, as indicated at step 608. The sector then marks the current AT's "Auxiliary Pilot Unconditional-ON Command Status" as SET (step 610), then proceeds to the next AT in the loop (616). The dashed arrow from block 610 to block 604 represents marking the status indicator.

If at step 605 the current AT's "Auxiliary Pilot Unconditional-ON Command Status" is SET ("Yes" branch from step 605), then the AT's auxiliary pilot is already on and the AT is in the second state described above. In this case, the sector determines where the DRC erasure rate lies with respect to the band between the Low-Mark and High-Mark Threshold rates that sandwiches the Mid-Mark Threshold rate. Specifically, the sector compares the DRC erasure rate for the current AT against the Low-Mark threshold rate, as indicated at step 607. If the DRC erasure rate exceeds the Low-Mark threshold rate ("Yes" branch from step 607), then the addition of AT's auxiliary pilot has evidently not reduced the DRC erasure rate sufficiently to warrant ceasing unconditional auxiliary pilot transmission. Consequently, the sector then compares the DRC erasure rate for the current AT against the High-Mark threshold rate, as indicated at step 609. If the DRC erasure rate does not exceed the High-Mark threshold rate ("No" branch from step 609), then the DRC erasure rate remains within the Low-Mark/High-Mark threshold band. In this case, no action is taken for the current AT, and the sector proceeds to the next AT in the loop (step 616).

If at step 609 the DRC erasure rate does exceed the High-Mark threshold rate ("Yes" branch from step 609), then the DRC erasure rate has crossed above top of the Low-Mark/High-Mark threshold band. In this case, the sector transmits a DRC Lock set message to the current AT, as indicated at step 611. The sector then marks the current AT's "Auxiliary Pilot Unconditional-ON Command Status" as CLEAR (step 615), since the DRC Lock set message will cause the current AT to transition to operating in the first state. Finally, the sector proceeds to the next AT in the loop (step 616).

If at step 607 the DRC erasure rate does not exceed the Low-Mark threshold rate ("No" branch from step 607), then the addition of AT's auxiliary pilot evidently has reduced the DRC erasure rate sufficiently to warrant ceasing auxiliary pilot transmission. Hence, in this case, the sector transmits a command to the current AT instructing it to cease unconditional transmission of its auxiliary pilot, as indicated at step 613. The sector then marks the current AT's "Auxiliary Pilot Unconditional-ON Command Status" as CLEAR (step 615), and proceeds to the next AT in the loop (616). Again, the dashed arrow from block 615 to block 604 represents marking the status indicator. The sector then proceeds to the next AT in the loop (step 616).

From step 616, the sector returns to step 602, and applies the method to the next AT in the loop. Once the loop is complete, the sector may repeat the loop from the beginning Note that while looping over access terminals, the sector may cease serving some of the current access terminals and start serving different access terminals. Consequently, the specific ATs in the loop may differ over the course of carrying out the method steps.

It will be appreciated that the steps shown in FIGS. 5 and 6 are meant to illustrate example client-side and system-side method. As such, various steps could be altered or modified, and the ordering of certain steps could be changed, while still achieving the overall desired operation.

b. Example Means

(1) Example Access Terminal

Figure 7:
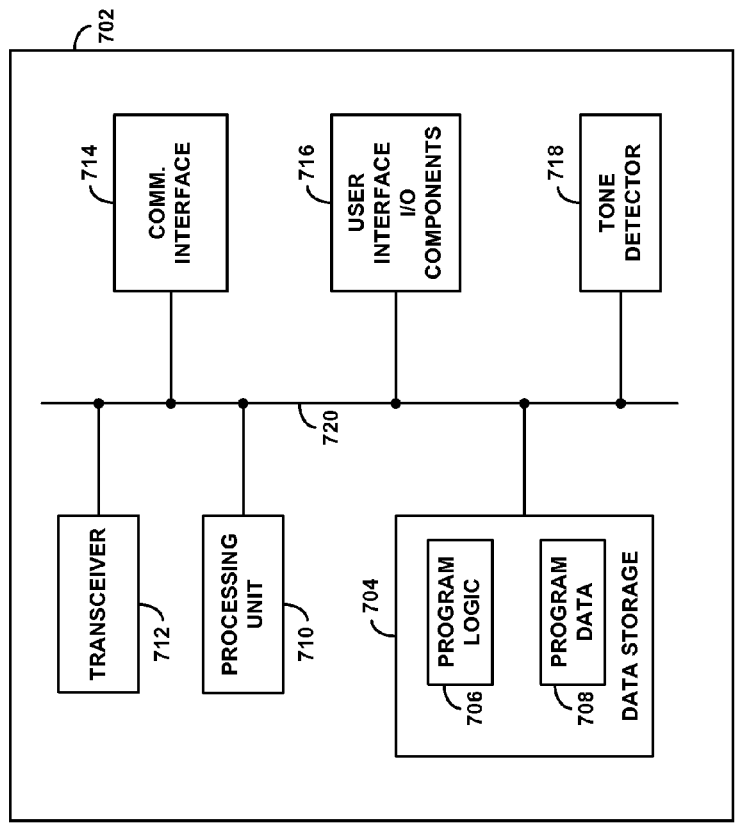
FIG. 7 is a block diagram of an example access terminal in which of enhanced reverse-link auxiliary pilot triggering may be implemented.

FIG. 7 is a simplified block diagram depicting functional components of an example access terminal 702 in which the client-side method of enhanced reverse-link auxiliary pilot triggering may be implemented. The example AT 702 could be a cell phone, a personal digital assistant (PDA), a pager, a wired or wirelessly-equipped notebook computer, or any other sort of device. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 702 relevant to triggering a variable auxiliary pilot are discussed briefly below.

Communication interface 714 in combination with transceiver 712, which may include one or more antennas, enables communication with the network, including reception from the serving base station of DRC Lock messages and commands to commence and/or cease unconditional transmission of an auxiliary pilot, and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 710 comprises one or more general-purpose processors (e.g., INTEL microprocessors) and/or one or more special-purpose processors (e.g., dedicated digital signal processor, application specific integrated circuit, etc.). In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise machine language instructions that define routines executable by processing unit 710 to carry out various functions described herein. In particular the program logic, communication interface, and transceiver may operate cooperatively to carry out logical operation such as that discussed above and illustrated in FIG. 5. Further, program data 708 may be arranged to store data used in conjunction with the logical operations described above.

It will be appreciated that there can be numerous specific implementations of an access terminal, such as AT 702, in which the client-side method of enhanced reverse-link auxiliary pilot triggering could be made operable. Further, one of skill in the art would understand how to devise and build such an implementation. As such, AT 702 is representative of means for carrying out the client-side method of enhanced reverse-link auxiliary pilot triggering in accordance with the methods and steps described herein by way of example.

(2) Example Base Station

Figure 8:
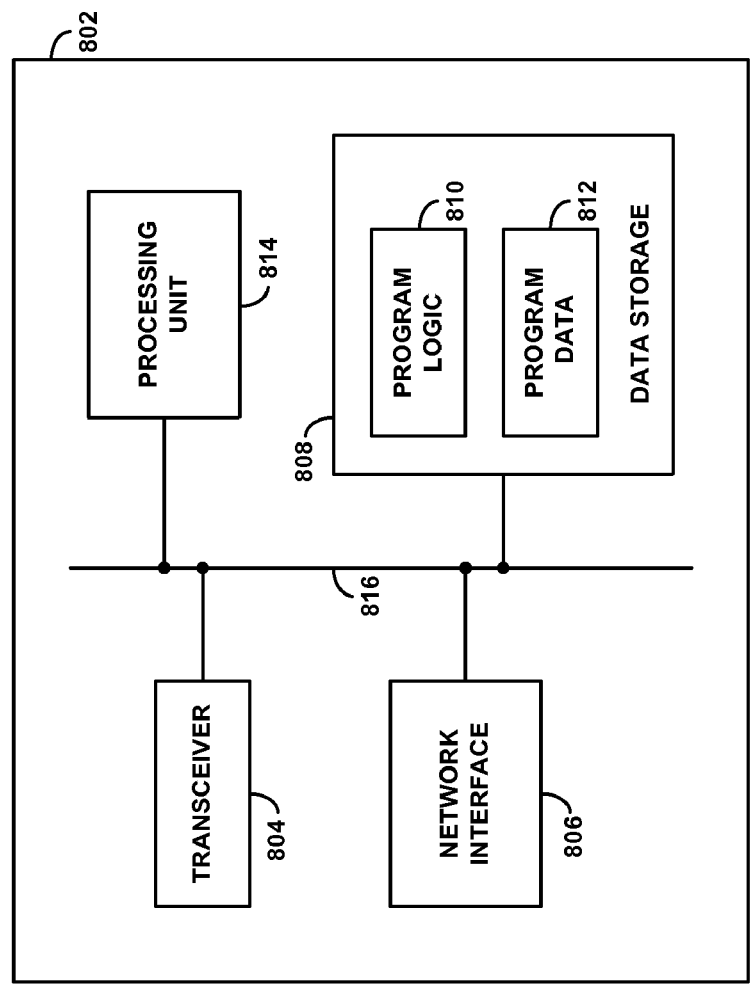
FIG. 8 is a block diagram of an example base station in which of enhanced reverse-link auxiliary pilot triggering may be implemented.

FIG. 8 is a simplified block diagram depicting functional components of an example base station 802 in which the system-side method of enhanced reverse-link auxiliary pilot triggering may be implemented. As shown in FIG. 8, the example base station 802, representative of BTS 304 or BSC 306 integrated with BTS 304 FIG. 3, for instance, includes a transceiver 804, network interface 806, a processing unit 814, and data storage 808, all of which may be coupled together by a system bus 816 or other mechanism. In addition, the base station may also include external storage, such as magnetic or optical disk storage, although this is not shown in FIG. 8.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 802 relevant to intelligent power control are discussed briefly below.

Network interface 806 enables communication on a network, such network 300. As such, network interface 806 may take the form of trunk or optical link that can be coupled with a TDM switch such as MSC 308, or an Ethernet network interface card or other physical connection that can be coupled with PCF 314, for instance. Further, network interface 806 in combination with transceiver 804, which may include one or more BTS antennas, enables air interface communication with one or more access terminals, supporting forward-link transmissions of DRC Lock messages and commands to commence and/or cease unconditional transmission of an auxiliary pilot, among others, and supporting reception of DRC messages, and primary and auxiliary pilot transmissions, among others, on reverse links.

Processing unit 814 comprises one or more general-purpose processors (e.g., INTEL microprocessors) and/or one or more special-purpose processors (e.g., dedicated digital signal processor, application specific integrated circuit, etc.). In turn, the data storage 808 comprises one or more volatile and/or non-volatile storage components, such as magnetic or optical memory or disk storage. Data storage 800 can be integrated in whole or in part with processing unit 814, as cache memory or registers for instance. As further shown, data storage 808 is equipped to hold program logic 810 and program data 812.

Program logic 810 may comprise machine language instructions that define routines executable by processing unit 814 to carry out various functions described herein. In particular the program logic, communication interface, and transceiver may operate cooperatively to carry out logical operation such as that discussed above and illustrated in FIG. 6. Further, program data 812 may be arranged to store data, such as the "Auxiliary Pilot Unconditional-ON Command Status," used in conjunction with the logical operations described above.

It will be appreciated that there can be numerous specific implementations of a base station or sector, such as base station 802, in which the system-side method of enhanced reverse-link auxiliary pilot triggering could be made operable. Further, one of skill in the art would understand how to devise and build such an implementation. As such, base station 802 is representative of means for carrying out the system-side method of enhanced reverse-link auxiliary pilot triggering in accordance with the methods and steps described herein by way of example.

5. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal configured to operate in a wireless communication system that includes a base station, a method comprising:
operating in a first state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; and
while operating in the first state, upon receiving a first message from the base station, the first message comprising a command to transmit the secondary beacon signal, transitioning to operating in a second state in which at least (i) the access terminal transmits the primary beacon signal, and (ii) the access terminal concurrently and unconditionally activates and transmits the secondary beacon signal.

2. The method of claim 1, wherein the primary beacon signal provides the base station with a common timing reference between the base station and the access terminal, the common timing reference facilitating decoding by the base station of other signals transmitted by the access terminal,
and wherein the secondary beacon signal provides the base station with enhanced reliability of the common timing reference.

3. The method of claim 1, wherein the access terminal is further configured to operate according to a code division multiple access (CDMA) family of protocols including IS-856, wherein the primary beacon signal is a primary pilot signal and the secondary beacon signal is an auxiliary pilot signal, and wherein the threshold packet size corresponds to a value of AuxiliaryPilotChannelMinPayload.

4. The method of claim 1, wherein receiving the first message from the base station comprises receiving at the access terminal an indication that particular signals transmitted from the access terminal have been detected below a first threshold level at the base station.

5. The method of claim 4, wherein the access terminal is further configured to operate according to a code division multiple access (CDMA) family of protocols including IS-856,
wherein the base station comprises a given coverage area, the given coverage area being at least one of a given cell and a given sector,
wherein the particular signals transmitted from the access terminal comprise one or more data rate control (DRC) commands transmitted to the given coverage area,
and wherein receiving at the access terminal the indication that the particular signals transmitted from the access terminal have been detected below the first threshold level at the base station comprises receiving at the access terminal an indication from the given coverage area that a DRC erasure rate for the DRC commands transmitted from the access terminal exceeds a mid-mark threshold rate.

6. The method of claim 5, further comprising:
while operating in the second state and communicating in the wireless communication system via the given coverage area, upon receiving a DRC Lock set message from the given coverage area:
transitioning to operating the first state;
ceasing communicating via the given coverage area; and
seeking to communicate in the wireless communication system via a different coverage area, the different coverage area being at least one of a different cell and a different sector.

7. The method of claim 1, further comprising:
while operating in the second state, upon receiving a second message from the base station, the second message comprising a command to cease unconditional transmission of the secondary beacon signal, transitioning to operating in the first state.

8. The method of claim 7, wherein receiving the second message from the base station comprises receiving at the access terminal an indication that particular signals transmitted from the access terminal have been detected at or above a second threshold level at the base station.

9. The method of claim 8, wherein the access terminal is further configured to operate according to a code division multiple access (CDMA) family of protocols including IS-856,
wherein the base station comprises a given coverage area, the given coverage area being at least one of a given cell and a given sector,
wherein the particular signals transmitted from the access terminal comprise one or more data rate control (DRC) commands transmitted to the given coverage area,
and wherein receiving at the access terminal the indication that the particular signals transmitted from the access terminal have been detected at or above the second threshold level at the base station comprises receiving at the access terminal an indication from the given coverage area that a DRC erasure rate for the DRC commands transmitted from the access terminal does not exceed a low-mark threshold rate.

10. In a base station configured to operate as part of a wireless communication system, a method comprising:
at the base station, receiving a primary beacon signal transmitted from an access terminal;
at the base station, making a first determination that particular signals received from the access terminal have been detected below a first threshold level; and
responsive to the first determination, transmitting a first message to the access terminal, the first message comprising a command to unconditionally transmit a secondary beacon signal concurrently with transmission of the primary beacon signal, wherein the primary beacon signal is used by the base station to maintain a common timing reference between the base station and the access terminal, the common timing reference facilitating decoding by the base station of other signals received from the access terminal, and wherein the secondary beacon signal is used by the base station to enhance reliability of the common timing reference.

11. The method of claim 10, wherein the base station is further configured to operate according to a code division multiple access (CDMA) family of protocols including IS-856, and wherein the primary beacon signal is a primary pilot signal and the secondary beacon signal is an auxiliary pilot signal.

12. The method of claim 10, wherein the base station is further configured to operate according to a code division multiple access (CDMA) family of protocols including IS-856, wherein the base station comprises a given coverage area, the given coverage area being at least one of a given cell and a given sector, wherein the particular signals received from the access terminal comprise one or more data rate control (DRC) commands transmitted from the access terminal to the given coverage area, and wherein making the first determination that the particular signals received from the access terminal have been detected below the first threshold level comprises determining that a DRC erasure rate for the DRC commands transmitted from the access terminal exceeds a mid-mark threshold rate.

13. The method of claim 12, further comprising:

subsequent to transmitting the first message to the access terminal, determining that the DRC erasure rate for the DRC commands transmitted from the access terminal exceeds a high-mark threshold rate; and responsively transmitting a DRC Lock set message to the access terminal.

14. The method of claim 10, further comprising:

subsequent to transmitting the first message to the access terminal, making a second determination that the particular signals received from the access terminal have been detected at or above a second threshold level; and responsive to the second determination, transmitting a second message to the access terminal, the second message comprising a command to cease unconditional transmission of the secondary beacon signal.

15. The method of claim 14, wherein the base station is further configured to operate according to a code division multiple access (CDMA) family of protocols including IS-856, wherein the base station comprises a given coverage area, the given coverage area being at least one of a given cell and a given sector, wherein the particular signals received from the access terminal comprise one or more data rate control (DRC) commands transmitted from the access terminal to the given coverage area, and wherein making the second determination that the particular signals received from the access terminal have been detected at or above the second threshold level comprises determining that a DRC erasure rate for the DRC commands transmitted from the access terminal does not exceed a low-mark threshold rate.

16. An access terminal configured to operate in a wireless communication system that includes a base station, the access terminal comprising:

means for operating in a first state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal;

means for receiving a first message from the base station while operating in the first state, the first message comprising a command to transmit the secondary beacon signal; and means for, responsive to receiving the first message, transitioning to operating in a second state in which at least (i) the access terminal transmits the primary beacon signal, and (ii) the access terminal concurrently and unconditionally activates and transmits the secondary beacon signal.

17. The access terminal of claim 16, wherein the primary beacon signal provides the base station with a common timing reference between the base station and the access terminal, the common timing reference facilitating decoding by the base station of other signals transmitted by the access terminal, and wherein the secondary beacon signal provides the base station with enhanced reliability of the common timing reference.

18. The access terminal of claim 16, wherein the access terminal is further configured to operate according to a code division multiple access (CDMA) family of protocols including IS-856, wherein the primary beacon signal is a primary pilot signal and the secondary beacon signal is an auxiliary pilot signal, and wherein the threshold packet size corresponds to a value of AuxiliaryPilotChannelMinPayload.

19. The access terminal of claim 16, wherein the access terminal is further configured to operate according to a code division multiple access (CDMA) family of protocols including IS-856, wherein the base station comprises a given coverage area, the given coverage area being at least one of a given cell and a given sector, and wherein receiving the first message from the base station comprises receiving at the access terminal an indication from the given coverage area that a data rate control (DRC) erasure rate for DRC commands transmitted from the access terminal to the given coverage area exceeds a mid-mark threshold rate.

20. The access terminal of claim 19, further comprising:

means for receiving a DRC Lock set message from the given coverage area while both operating in the second state and communicating in the wireless communication system via the given coverage area; and means for, responsive to receiving the DRC Lock set message:

transitioning to operating in the first state, ceasing communicating via the given coverage area, and seeking to communicate in the wireless communication system via a different coverage area, the different coverage area being at least one of a different cell and a different sector.

21. The access terminal of claim 16, further comprising:
means for receiving a second message from the base station while operating in the second state, the second message comprising a command to cease unconditional transmission of the secondary beacon signal; and
means for, responsive to receiving the second message, transitioning to operating in the first state.

22. The access terminal of claim 21, wherein the access terminal is further configured to operate according to a code division multiple access (CDMA) family of protocols including IS-856,
wherein the base station comprises a given coverage area, the given coverage area being at least one of a given cell and a given sector,
and wherein receiving the second message from the base station comprises receiving at the access terminal an indication from the given coverage area that a data rate control (DRC) erasure rate for DRC commands transmitted from the access terminal to the given coverage area does not exceed a low-mark threshold rate.

23. A base station configured to operate as part of a wireless communication system, the base station comprising:
means for receiving a primary beacon signal transmitted from an access terminal;
means for making a first determination that particular signals received from the access terminal have been detected below a first threshold level; and
means for transmitting a first message to the access terminal in response to the first determination, the first message comprising a command to unconditional transmit a secondary beacon signal concurrently with transmission of the primary beacon signal,
wherein the primary beacon signal is used by the base station to maintain a common timing reference between the base station and the access terminal, the common timing reference facilitating decoding by the base station of other signals received from the access terminal, and
wherein the secondary beacon signal is used by the base station to enhance reliability of the common timing reference.

24. The base station of claim 23, wherein the base station is further configured to operate according to a code division multiple access (CDMA) family of protocols including IS-856, and wherein the primary beacon signal is a primary pilot signal and the secondary beacon signal is an auxiliary pilot signal.

25. The base station of claim 23, wherein the base station is further configured to operate according to a code division multiple access (CDMA) family of protocols including IS-856,
wherein the base station further comprises a given coverage area, the given coverage area being at least one of a given cell and a given sector,
wherein the particular signals received from the access terminal comprise one or more data rate control (DRC) commands transmitted from the access terminal to the given coverage area,
and wherein making the first determination that the particular signals received from the access terminal have been detected below the first threshold level comprises determining that a DRC erasure rate for the DRC commands transmitted from the access terminal exceeds a mid-mark threshold rate.

26. The base station of claim 25, further comprising:
means for, subsequent to transmitting the first message to the access terminal, determining that the DRC erasure rate for the DRC commands transmitted from the access terminal exceeds a high-mark threshold rate; and
means for responsively transmitting a DRC Lock set message to the access terminal.

27. The base station of claim 23, further comprising:
means for, subsequent to transmitting the first message to the access terminal, making a second determination that the particular signals received from the access terminal have been detected at or above a second threshold level; and
means for transmitting a second message to the access terminal in response to the second determination, the second message comprising a command to cease unconditional transmission of the secondary beacon signal.

28. The base station of claim 27, wherein the base station is further configured to operate according to a code division multiple access (CDMA) family of protocols including IS-856,
wherein the base station further comprises a given coverage area, the given coverage area being at least one of a given cell and a given sector,
wherein the particular signals received from the access terminal comprise one or more data rate control (DRC) commands transmitted from the access terminal to the given coverage area,
and wherein making the second determination that the particular signals received from the access terminal have been detected at or above the second threshold level comprises determining that a DRC erasure rate for the DRC commands transmitted from the access terminal does not exceed a low-mark threshold rate.

* * * * *